United States Patent

[11] 3,628,966

[72] Inventors Noboru Katsuya;
　　Takaaki Sagara; Reiji Takahashi; Teruo Yoshida; Takashi Ojima, all of Kanagawa-ken, Japan
[21] Appl. No. 826,270
[22] Filed May 20, 1969
[45] Patented Dec. 21, 1971
[73] Assignee Ajinomoto Co., Inc.
　　Tokyo, Japan
[32] Priority May 28, 1968
[33] Japan
[31] 43/36299

[54] PROCESS FOR PRODUCING ENRICHED ARTIFICIAL RICE
8 Claims, No Drawings

[52] U.S. Cl. .................................................. 99/80 R, 99/83
[51] Int. Cl. .................................................. A23l 1/10
[50] Field of Search .................................... 99/80 R, 85

[56] References Cited
UNITED STATES PATENTS
3,231,388　1/1966　White .......................... 99/80 PS

OTHER REFERENCES

Bhatia et al., Food Manufacture Sept. 1956, pages 376-380- article entitled Substitute Foods Kimura-Chemical Abstracts Vol. 52 17560, article entitled Artificial Rice

*Primary Examiner*—Raymond N. Jones
*Attorney*—Kurt Kelman

ABSTRACT: An enriched artificial rice having grains of good mechanical strength and resistant to washing, soaking, and cooking without losing their similarity to natural rice grains is prepared by heating a mixture of amino acids, starch and enough water to make the water content of the mixture 20 percent to 50 percent at 90° to 120° C. for 45 minutes to 1 minute, whereby the starch is semigelatinized. Starch or gluten is thereafter added as a binder to produce a second mixture which is granulated to the shape of rice grains, and the artificial grains are dried and coated with a waterproofing material.

PROCESS FOR PRODUCING ENRICHED ARTIFICIAL RICE

This invention relates to a method of producing artificial rice enriched with a large amount of amino acids.

The enriched artificial ricelike grains by the known methods are satisfactory only if breaking of grains during boiling is acceptable.

The present invention aims at the preparation of a granular, ricelike food, hereinafter referred to as artificial rice, which is highly enriched as could not be accomplished before, maintaining mechanical strength of the grains and preventing dissolution of enriching nutrients from the grains into water during washing and soaking.

Amino acids cannot be formed into grains when mixed with water. When they amount to 6–50 percent by weight in the grains formed by mixing amino acids with starch or protein, the obtained grain is rather brittle and its hardness is merely 1–2 kg. by hardness meter.

It has now been found that it is essential to mix the raw materials in two steps.

The first step is to mix amino acids with starch, knead the mixture with water and heat with steam; and the second step is to mix suitable binder such as gluten and starch (with vitamins and minerals, if necessary) with the product obtained in the first step and knead it with water. The product of the second step is shaped in a granulator.

In the first step of mixing amino acids with starch, kneading the mixture with water and heating it with steam, the crystals of the amino acids employed are covered and solidified by starch, which makes the mixing in the second step satisfactory and brings about good hardness and elasticity and prevents breaking of the artificial rice grains.

Amino acids used in the first step are L-lysine hydrochloride, L-threonine, L- or DL-methionine and L- or DL-tryptophan. The starch employed in the present method, should be waterproof and have a low expansion rate such as is found in cross-linked starch (for example, distarch phosphate, and starch cross-linked with epichlorohydrin and amylose (for example, corn amylose).

The ratio of amino acids and starch may be varied according to the desired enrichment. The amount of water used for kneading the amino acids and starch should be 20 to 50 percent based on the weight of starch, which is enough to gelatinize the starch partly during heating with steam.

The heat treatment is performed for partly gelatinizing the starch at 90°–120° C. for 45 minutes to 1 minute. If the heat treatment is more severe, the starch granules are expanded and broken. The viscosity and elasticity of the starch and its ability to form grains are reduced as its tackiness increases, so that uniform grains of artificial rice can not be obtained. If the heat treatment with steam is performed at lower temperature for a shorter time, the starch granules do not gelatinize and do not adhere to nutrients.

The term "partly gelatinized starch" or "semigelatinized starch" refers to an intermediate phase between the above two states, in which starch keeps its granule form and is strongly tacky at the same time.

In the second step, gluten and/or starch, and optional vitamins and minerals are added. Glutens are especially effective for maintaining the mechanical strength of the grains during boiling. Water is added as needed and the mixture is kneaded. The water content of the mixture at the time of forming grains is preferably 28 to 40 percent.

Wheat gluten, corn gluten, and purified soybean protein are most suitable, and preferably amount to about 5–50 percent of the product. After mixing in the second step, the mixture is formed into grains and dried.

The grains formed are dried in warm air of less than 80° C. for a suitable time, until the water content is reduced to about 5–15 percent.

It is necessary to coat the surface of the grains in order to avoid leaching of the nutrients during prolonged washing and soaking.

It is known to gelatinize the surface of rice with formaldehyde and to coat the surface of rice with vinyl resin. It has been found that a coating of shellac or ethylcellulose greatly improves the water resistance of the artificial rice.

When cross-linked starch or amylose is sued in the first step, dissolution of amino acids during washing and soaking can be avoided adequately even if a pinhole happens to be in the coating.

The artificial rice produced according to the method of the present invention has adequate hardness and elasticity and a high content of nutrients. It resists washing and soaking for a long time. Accordingly, this artificial rice can be mixed with natural rice prior to cooking as usual. When cooking is finished, its grains are not broken and there is no difference between the artificial rice and the natural one in viscosity, elasticity and taste.

EXAMPLE 1

To a mixture of 400 g. of distarch phosphate, 140 g. of L-lysine hydrochloride and 70 g. of L-threonine, 300 ml. of water was added and the mixture was heated at 100° C. for 35 minutes with steam, whereby starch granules were semigelatinized. Then 90 g. of corn starch, 200 g. of wheat gluten, 20 g. of calcium carbonate and 150 ml. of water were added, and the mixtures so obtained was rolled into sheets (water content 33 percent) which were converted to grains in a double roller granulator.

The grains were screened and only rice-shaped grains were put into a dryer to reduce their water content to 13 percent. An alcohol solution containing 34 percent of shellac was sprinkled (30 ml. at one time) on the grains in a pancoating machine under warm air of 40°–60° C. until the added amount of shellac reached 80 g. The artificial rice thus produced was white, contained L-lysine hydrochloride 11 percent, L-threonine 5.5 percent and water 4 percent, had a hardness of 10 kg. by hardness meter, and could hardly be distinguished from natural rice in appearance and taste.

For comparison purposes, 490 g. of corn starch, 140 g. of L-lysine hydrochloride, 70 g. of L-threonine, 200 g. of wheat gluten, 20 g. of calcium chloride and 300 ml. of water were mixed and put into a granulator. The grains obtained were heated with steam at 100° C. for 3 minutes. The grains were not uniform and adhered to one another so that their surface became rough when they were separated. Although the grains were coated according to the method mentioned above, they broke and lost their shape during cooking after soaking in water.

EXAMPLE 2

To 460 g. of amilose of corn starch, 140 g. of L-lysine hydrochloride and 70 g. of L-threonine, 150 ml. of water was added and mixed well. The mixture was heated with steam at 120° C. for 10 minutes, and 130 g. of corn gluten, 100 g. of corn starch, 20 g. of calcium carbonate, 0.6 g. of vitamin A, 0.1 g. of vitamin $B_1$ hydrochloride and 200 g. of water were mixed in thereafter. The product 1,000 g. was finished by the same methods as in example 1.

EXAMPLE 3

To the mixture of 227 g. of epichlorohydrin cross-linked starch, 333 g. of L-lysine hydrochloride, 83.5 g. of L-threonine and 83.5 g. of DL-methionine, 170 of water was added and mixed well. The starch was semigelatinized by heat treatment with steam at 100° C. for 35 minutes, and then 54 g. of wheat gluten, 0.4 g. of vitamin $B_1$ naphthalenedisulfonate, 0.1 g. of vitamin $B_2$, 20 g. of calcium carbonate and 8 g. of ferrics phosphate. Four hydrates were added and mixed well. The obtained mixture was put into a macaroni form granulator and formed to rice-shaped grains whose water content was reduced to 15 percent by drying with warm air at 70° C. The dried grains were coated by spraying with an alcohol solution containing 10 percent of shellac and 1 percent of ethylcellulose on an automatic coating machine under warm aeration at 40° C.

What we claim is:
1. A method of producing artificial rice essentially consisting of starch, amino acid, and a binder which comprises:
   a. mixing said amino acid with starch and with enough water to make the water content of the resulting initial mixture 20 percent to 50 percent;
   b. heating said mixture with steam until said starch is semigelatinized;
   c. thereafter adding to said mixture a binder selected from the group consisting of starch and gluten to produce a binder-bearing mixture;
   d. shaping grains resembling rice grains from said binder-bearing mixture;
   e. drying said grains to a water content of substantially more than 15 percent; and
   f. coating the dried grains with water-proofing material.
2. A method as set forth in claim 1, wherein said initial mixture is heated at 90° to 120° C. for 45 minutes to 1 minute.
3. A method as set forth in claim 1, wherein said amino acid is selected from the group consisting of L-lysine, L-threonine, L- and DL-methionine, and L- and DL-tryptophan.
4. A method as set forth in claim 1, wherein the water content of said binder-bearing mixture is adjusted to 28 percent to 40 percent prior to said drying.
5. A method as set forth in claim 1, wherein said grains are dried at a temperature below 80° C. to a water content of 5 percent to 15 percent.
6. A method as set forth in claim 1, wherein said water proofing material is shellac or ethylcellulose.
7. A method as set forth in claim 1, wherein said initial mixture is heated at 90° to 120° C. for 45 minutes to 1 minute, the water content of said binder-bearing mixture is adjusted to 28 percent to 40 percent prior to said drying, and said grains are dried at a temperature below 80° C.
8. A method as set forth in claim 7, wherein said amino acid is selected from the group consisting of L-lysine, L-threonine, L- and DL-methionine, and L- and DL-tryptophan, and amounts to 6 percent to 50 percent of the weight of said food.

* * * * *